United States Patent [19]

Carriere

[11] 4,204,412
[45] May 27, 1980

[54] CONSTANT VELOCITY UNIVERSAL JOINT
[75] Inventor: Donald L. Carriere, Livonia, Mich.
[73] Assignee: Ford Motor Company, Dearborn, Mich.
[21] Appl. No.: 961,170
[22] Filed: Nov. 16, 1978
[51] Int. Cl.² .................................................. F16D 3/30
[52] U.S. Cl. ........................................ 64/17 R; 64/21
[58] Field of Search ............................ 64/21, 17 R, 7

[56] References Cited
U.S. PATENT DOCUMENTS

| | | | |
|---|---|---|---|
| 2,137,179 | 11/1938 | Nelson | 64/21 |
| 2,653,456 | 9/1953 | Heym | 64/21 |
| 3,050,963 | 8/1962 | Simonds et al. | 64/21 |
| 3,263,447 | 8/1966 | Baker | 64/21 |
| 3,385,081 | 5/1968 | Wier | 64/21 |
| 3,538,721 | 11/1970 | Reddy | 64/21 |
| 3,965,700 | 6/1976 | Nicoletti | 64/21 |
| 4,080,804 | 3/1978 | Falk | 64/21 |

*Primary Examiner*—Ira S. Lazarus
*Attorney, Agent, or Firm*—Donald J. Harrington; Keith L. Zerschling

[57] ABSTRACT

A constant velocity universal joint adapted to connect drivably a driving shaft to a driven shaft comprising a driving yoke connected to the driving shaft, a driven yoke connected to the driven shaft, a guide slot in the driving yoke with its axis parallel to the axis of the driving shaft, a guide slot in the driven yoke with its axis parallel to the axis of the driven shaft, an intermediate driving member disposed between adjacent ends of the driving shaft and the driven shaft, a drive element situated in each guide slot, said drive elements being carried by the ends of said driving member, means for biasing said intermediate driving member toward a central position whereby the plane of said intermediate driving member bisects the included angle between said driving shaft and said driven shaft, and spherical bearing means for establishing an articulated connection between the adjacent ends of said driving shaft and for supporting said intermediate driving member for universal oscillation.

4 Claims, 2 Drawing Figures

CONSTANT VELOCITY UNIVERSAL JOINT

BRIEF DESCRIPTION OF THE INVENTION

My invention comprises improvements in constant velocity universal joints for drive shafts, axle shafts and the like. Examples of prior art constructions are shown in U.S. Pat. Nos. 3,575,924; 3,128,613; 3,128,827 and 3,105,369. These prior art constructions as well as other known prior art constructions employ a driving member having internal ball grooves and a driven member having external ball grooves, the driving member and driven member being arranged in concentric relationship and driving balls situated in the registering grooves in the driving member and the driven member, the balls being positioned by a carrier which allows the balls to transmit torque from one member to the other. Unlike these prior art arrangements, my present arrangement comprises a driving member and a driven member wherein each carries a yoke, which may be similar in shape; and an internal groove is formed on each yoke. There is no external groove on one of the members as in the prior art constructions, and machining is substantially simplified because of this. My improved construction also is capable of accommodating constant velocity torque transmission with the driving shaft and the driven shaft having a large relative angular displacement.

The adjacent ends of the driving and driven shafts are joined together by a spherical bearing thereby permitting universal movement between them and causing the axes of the shafts to intersect at a point on the geometric axis of the intermediate driving member.

The intermediate driving member is arranged to provide support for driving balls that are situated in the grooves for the driving yoke and the driven yoke. A spring is situated on either side of each ball so that the driving member is biased toward an intermediate position such that the centerline of the driving member bisects the included angle between the driving shaft and the driven shaft. This bisection of the shaft angle is present regardless of the angular disposition of one shaft with respect to the other and regardless of the angular displacement of the universal joint.

PARTICULAR DESCRIPTION OF THE INVENTION

Figures 1, 2:
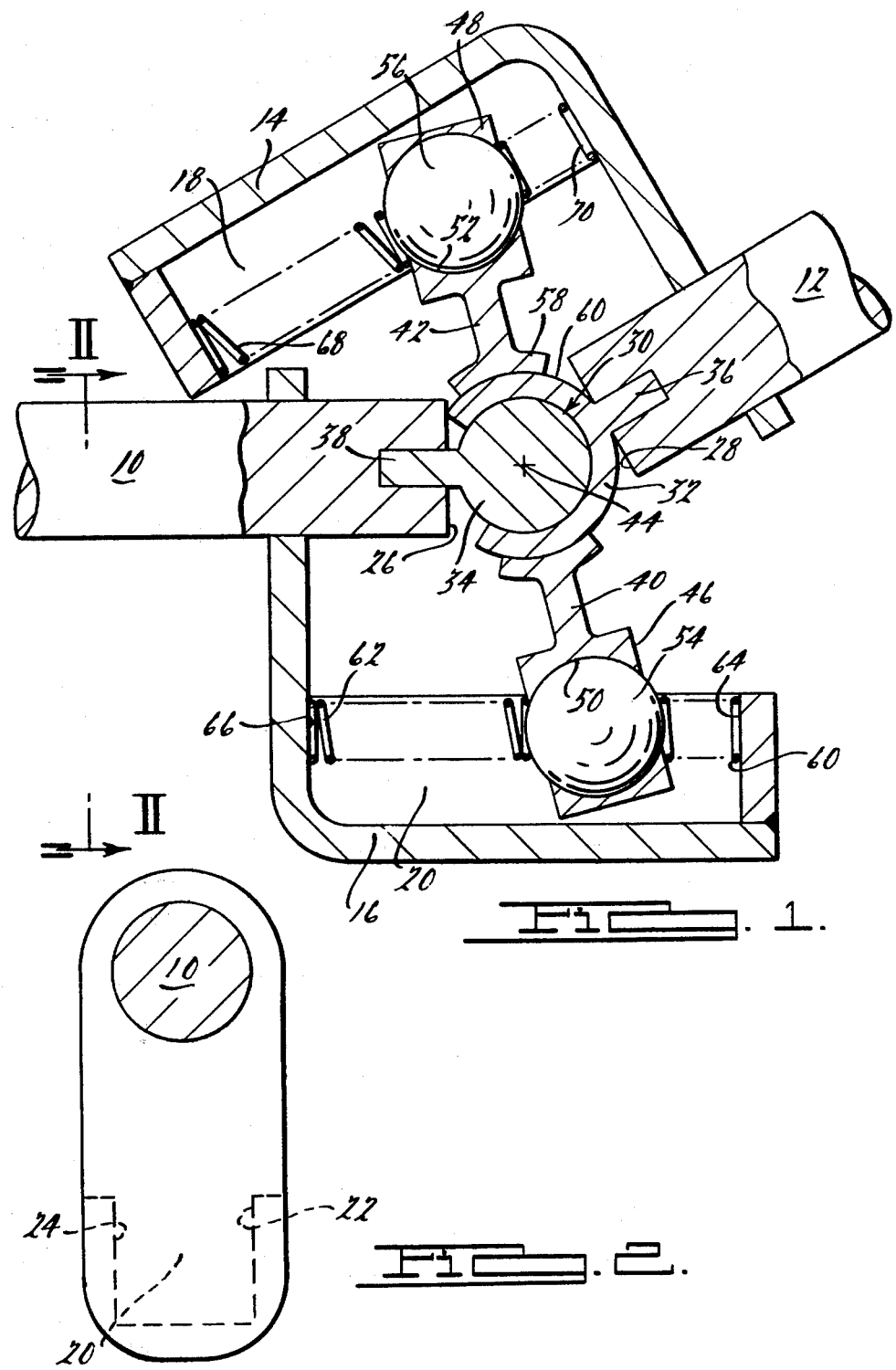
FIG. 1 is a schematic representation showing in cross section the principal elements of the constant velocity universal joint of my invention.
FIG. 2 is an end view taken along the plane of section line 202 of FIG. 1.

Numeral 10 designates a driving shaft and numeral 12 desiginates a driven shaft. A driven yoke 14 is carried by or formed integrally with the driven shaft 12. Similarly, a driving yoke 16 is carried by or formed integrally with the driving shaft 10. Each yoke is formed with a guide slot, the guide slot for yoke 14 being shown at 18 and the suide slot for yoke 16 being shown at 20. As seen in FIG. 2, the guide slot has parallel sides 22 and 24; and the centerline of the slot 20 is parallel to the axis of the shaft 10. Similarly, the centerline for the slot 18 is parallel to the axis of shaft 12.

The adjacent ends 26 and 28 for the shaft 10 and 12, respectively, are joined together by universal spherical bearings identified generally by reference character 30. The bearing 30 comprises an internal spherical member 32 and a spherical member 34 received in the internal member 32 to define a so-called, ball-and-socket bearing. Member 32 carries a pilot shaft 36, and a corresponding pilot shaft 38 is carried by the member 34. Pilot shaft 36 is received in a cooperating recess formed in the shaft end 28, and the pilot shaft 38 is received in a cooperating recess formed in the end 26.

An intermediate driving member 40 is disposed within the yokes 14 and 16 and is situated intermediate the ends 26 and 28. The intermediate driving member 40 has a geometric axis 42 which intersects the point of intersection 44 for the shafts 10 and 12. That point of intersection is at the geometric center of the bearing element 34 and 32. The ends of the intermediate driving member carry ball carriers 46 and 48. Ball carriers are formed with internal spherical recesses 50 and 52, respectively, which receive driving balls. The driving ball for the guide slot 20 is shown at 54, and the corresponding driving ball for the drive slot 18 is shown at 56. The balls are arranged so that they are fitted in the slots 18 and 20 with minimum clearance.

The hub of the intermediate driving member is formed to define an internal spherical bearing member 58, which is adapted to cooperate with the spherical surface 16 of the bearing member 32. Thus the spherical bearing 30 comprises two independent bearing assemblies, the bearing element 32 acting both as an internal spherical bearing for the spherical element 34 and an external bearing element for the internal spherical bearing element 58.

Positioning springs 60 and 62 act on the ball 54. These springs are seated on the ends 64 and 66, respectively, for the yoke 16. Corresponding positioning springs 68 and 70 are provided for the yoke 14 and for the ball 56. The positioning springs tend to position the intermediate driving member 40 so that it bisects the included angle between the shafts 10 and 12 as torque is transmitted from one shaft to the other through the intermediate driving member regardless of the angularity of the shafts.

The yokes may be similar or identical in shape, as may be the balls and the guide blocks, whereby the input elements and output elements for the universal joint are interchangeable.

I contemplate that the balls 54 and 56 can be replaced by cylindrical blocks in the guide slots, but balls are preferred because of ease of manufacture of the assembly and because of the reduced friction.

Having described a preferred embodiment of my invention, what I claim and desire to secure by U.S. Letters Patent is:

1. A constant velocity universal joint for transferring rotary motion from a driving shaft to a driven shaft wherein one shaft is adapted to be displaced angularly with respect to the other, a driving yoke carried by one end of said driving shaft, a driven yoke carried by one end of said driven shaft, an internal cam guide slot formed in each yoke, an intermediate driving member located between said one end of said driving shaft and said one end of said driven shaft, at least one circular bearing element carried by said intermediate driving member, said intermediate driving member being positioned such that its principal plane passes through the point of intersection of the axis of said shaft, said rotary bearing elements being received in said guide slots, the latter extending in the direction of the axes of their respective shafts, a universal spherical bearing means connecting together said one end of said driving shaft with said one end of said driven shaft for universal articulation and for journalling said intermediate driving member for universal movement about the point of intersection of the axes of said shafts, and means for positioning said intermediate driving member toward a central position whereby the line connecting the geometric center of said bearing element and said point of intersection bisects the included angle between said shafts.

2. The combination as set forth in claim 1 wherein said means for positioning said intermediate member comprises a first pair of compression springs located in said driving yoke, one spring acting on either side of said bearing element whereby said intermediate driving member is urged toward a central position for all relative angular positions of said shafts as torque is transmitted through the intermediate member from one shaft to the other.

3. The combination as set forth in claim 1 wherein said spherical bearing means comprising an internal bearing socket connected to said one end of one of said shafts, a ball received in said socket and connected to said one end of the other shaft, the socket defining a second spherical member of a secondary ball-and-socket bearing, said second spherical member registering with a cooperating internal bearing member formed by said intermediate driving member, the geometric center of the secondary bearing and said ball and the point of intersection of the axes of said shafts being common.

4. The combination as set forth in claim 2 wherein said spherical bearing means comprising an internal bearing socket connected to said one end of one of said shafts, a ball received in said socket and connected to said one end of the other shaft, the socket defining a second spherical member of a secondary ball-and-socket bearing, said second spherical member registering with a cooperating internal bearing member formed by said intermediate driving member, the geometric center of the secondary bearing and said ball and the point of intersection of the axes of said shafts being common.

* * * * *